US012341292B2

(12) United States Patent
Yi et al.

(10) Patent No.: US 12,341,292 B2
(45) **Date of Patent: *Jun. 24, 2025**

(54) PLUG CONNECTOR WITH IMPROVED RELIABILITY

(71) Applicant: DONGGUAN LUXSHARE TECHNOLOGIES CO., LTD, Dongguan (CN)

(72) Inventors: Sihai Yi, Dongguan (CN); Zhaolong Zeng, Dongguan (CN); Tiesheng Li, Dongguan (CN); Qiongnan Chen, Dongguan (CN)

(73) Assignee: DONGGUAN LUXSHARE TECHNOLOGIES CO., LTD, Dongguan (CN)

( * ) Notice: Subject to any disclaimer, the term of this patent is extended or adjusted under 35 U.S.C. 154(b) by 381 days.

This patent is subject to a terminal disclaimer.

(21) Appl. No.: 17/892,428

(22) Filed: Aug. 22, 2022

(65) Prior Publication Data

US 2023/0163522 A1 May 25, 2023

(30) Foreign Application Priority Data

Nov. 22, 2021 (CN) ......................... 202122884896.2

(51) Int. Cl.
*H01R 13/627* (2006.01)
*H01R 13/629* (2006.01)
*H01R 13/639* (2006.01)

(52) U.S. Cl.
CPC ..... *H01R 13/6273* (2013.01); *H01R 13/6275* (2013.01); *H01R 13/629* (2013.01); *H01R 13/639* (2013.01)

(58) Field of Classification Search
CPC ................ H01R 13/631; H01R 13/514; H01R 13/6275; H01R 13/6335; H01R 13/6273
See application file for complete search history.

(56) References Cited

U.S. PATENT DOCUMENTS 6,746,264 B1 * 6/2004 Branch ................ H01R 13/633 439/352
10,916,887 B2 * 2/2021 Chan .................. H01R 13/6275
(Continued)

FOREIGN PATENT DOCUMENTS

CN 106159564 A * 11/2016 ......... H01R 13/6275
WO WO-2013030093 A2 * 3/2013 ......... H01R 13/6275

OTHER PUBLICATIONS

CN 106159564 with machine translation.*
QSFP Standard (Year: 2006).*

*Primary Examiner* — Renee S Luebke
*Assistant Examiner* — Paul D Baillargeon
(74) *Attorney, Agent, or Firm* — Birch, Stewart, Kolasch Birch, LLP

(57) ABSTRACT

A plug connector includes a housing, a built-in circuit board, a cable, two locking arms, a driving member, and a pull strap connected to the driving member. Each locking arm includes a locking protrusion, an abutting portion and a pivot portion. The driving member includes two driving arms. Each driving arm includes a protruding portion to pull the abutting portion. The locking arm is rotatable around the pivot part when the pull strap is pulled by an external force. At the same time, the locking protrusions can move along a thickness direction from a locked position to an unlocked position. The plug connector also includes two return springs for returning the locking arms after the external force is removed. As a result, the reliability of the plug connector of the present disclosure is improved.

20 Claims, 16 Drawing Sheets

(56) References Cited

U.S. PATENT DOCUMENTS

| | | | | |
|---|---|---|---|---|
| 11,283,218 | B2 * | 3/2022 | Qiao | H01R 13/6592 |
| 11,777,256 | B2 * | 10/2023 | Fan | H01R 13/639<br>439/489 |
| 11,876,315 | B2 * | 1/2024 | Mousa | H01R 13/6587 |
| 2019/0058287 | A1 | 2/2019 | Li et al. | |
| 2023/0163527 | A1 * | 5/2023 | Yi | H01R 13/6273<br>439/620.21 |
| 2024/0222911 | A1 * | 7/2024 | Li | H01R 13/6582 |
| 2024/0222912 | A1 * | 7/2024 | Li | H01R 13/6582 |

* cited by examiner

PLUG CONNECTOR WITH IMPROVED RELIABILITY

CROSS-REFERENCE TO RELATED APPLICATION

This patent application claims priority of a Chinese Patent Application No. 202122884896.2, filed on Nov. 22, 2021 and titled "PLUG CONNECTOR", the entire content of which is incorporated herein by reference.

TECHNICAL FIELD

The present disclosure relates to a plug connector, which belongs to a technical field of connectors.

BACKGROUND

A plug connector in the related art includes a housing, a tongue plate, a cable, a locking mechanism, and a pull strap connected to the locking mechanism. A plurality of conductive pads are provided on at least one surface of the tongue plate.

The locking mechanism includes locking arms on opposite sides, a connection portion connecting the locking arms and a return spring abutting against the connection portion. The pull strap includes a force applying portion located at a front end and abutting against the connection portion. When a backward pulling force is applied to the pull strap, the force applying portion of the pull strap drives the locking arms to move together, thereby achieving unlocking.

However, since only one return spring is provided by the plug connector in the related art, it is necessary to ensure that the return spring is installed in the middle of the connection portion. On one hand, this design increases the difficulty of manufacturing; and on the other hand, once the return spring is deflected, it may cause the locking mechanism to deflect, thereby causing unlocking failure. In addition, in the related art, the force applying portion directly abuts against the connection portion, since the pull strap has a certain flexibility, this easily causes the force acting on the connection portion to have other components. This easily causes the force applying portion and the connection portion to jam, thereby reducing the reliability of the plug connector.

SUMMARY

An object of the present disclosure is to provide a plug connector with high reliability.

In order to achieve the above object, the present disclosure adopts the following technical solution: a plug connector, including: a housing; a built-in circuit board, the built-in circuit board being partially located in the housing, the built-in circuit board including a tongue plate and a plurality of conductive pads provided on the tongue plate; and a cable, the cable being electrically connected to the built-in circuit board; wherein the plug connector further includes two locking arms installed in the housing, a driving member mated with the locking arms, and a pull strap connected with the driving member; wherein each locking arm includes a locking protrusion at a front end of the locking arm, an abutting portion located at a rear end of the locking arm, and a pivot portion located between the locking protrusion and the abutting portion, the locking protrusion protrudes beyond the housing along a thickness direction of the plug connector; wherein the driving member includes two driving arms, each driving arm matches with a corresponding locking arm, each driving arm includes a protruding portion for pulling the abutting portion; wherein the locking arm is rotatable around the pivot portion when the pull strap is pulled by an external force, so that the locking protrusion moves along the thickness direction inside the housing; and wherein the plug connector further includes two return springs, each return spring abuts against a corresponding locking arm, and each return spring is adapted to return the corresponding locking arm to an original position after the external force is removed.

Compared with the prior art, the pull strap of the present disclosure indirectly drives the locking arms through the driving member, which reduces the probability of the locking arms being jammed. In addition, the present disclosure is provided with two return springs corresponding to the locking arms, respectively, so that the force applied to the locking arms is more uniform, and the smoothness of the movement of the locking arms is improved. As a result, the reliability of the plug connector is improved.

DETAILED DESCRIPTION

Figure 1:
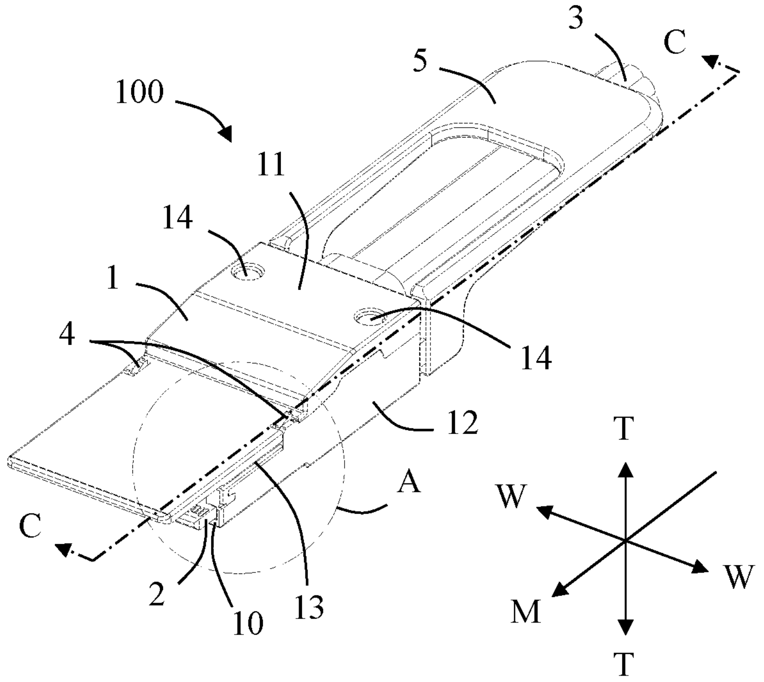
FIG. 1 is a perspective schematic view of a plug connector in accordance with an embodiment of the present disclosure.
Figure 2:
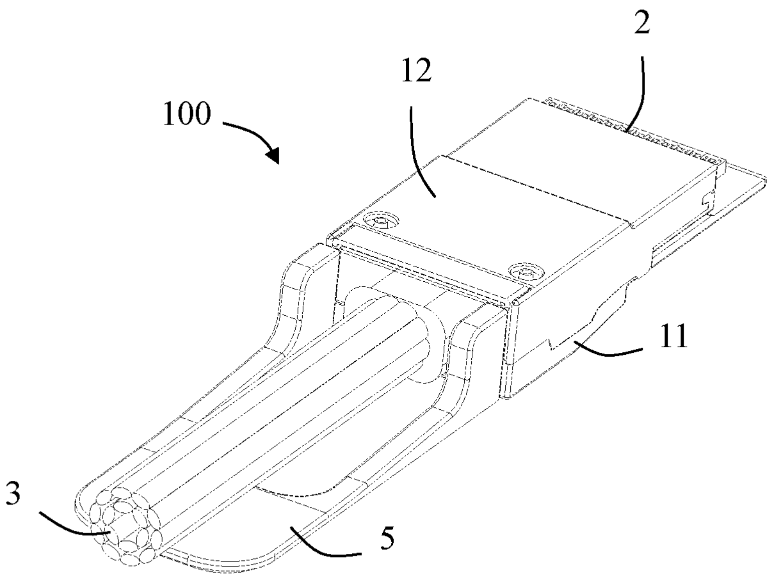
FIG. 2 is a perspective schematic view of FIG. 1 from another angle.

Exemplary embodiments will be described in detail here, examples of which are shown in drawings. When referring to the drawings below, unless otherwise indicated, same numerals in different drawings represent the same or similar elements. The examples described in the following exemplary embodiments do not represent all embodiments consistent with this application. Rather, they are merely examples of devices and methods consistent with some aspects of the application as detailed in the appended claims.

The terminology used in this application is only for the purpose of describing particular embodiments, and is not intended to limit this application. The singular forms "a", "said", and "the" used in this application and the appended claims are also intended to include plural forms unless the context clearly indicates other meanings.

It should be understood that the terms "first", "second" and similar words used in the specification and claims of this application do not represent any order, quantity or importance, but are only used to distinguish different components. Similarly, "an" or "a" and other similar words do not mean a quantity limit, but mean that there is at least one; "multiple" or "a plurality of" means two or more than two. Unless otherwise noted, "front", "rear", "lower" and/or "upper" and similar words are for ease of description only and are not limited to one location or one spatial orientation. Similar words such as "include" or "comprise" mean that elements or objects appear before "include" or "comprise" cover elements or objects listed after "include" or "comprise" and their equivalents, and do not exclude other elements or objects. The term "a plurality of" mentioned in the present disclosure includes two or more.

Hereinafter, some embodiments of the present disclosure will be described in detail with reference to the accompanying drawings. In the case of no conflict, the following embodiments and features in the embodiments can be combined with each other.

Referring to FIGS. 1 to 10, the present disclosure discloses a plug connector 100 including a housing 1, a built-in circuit board 2 partly located in the housing 1, a cable 3 electrically connected to the built-in circuit board 2, a locking mechanism 4 installed in the housing 1, and a pull strap 5 connected with the locking mechanism 4. In an embodiment of the present disclosure, the plug connector 100 is a high-speed interconnect plug connector, including but not limited to, a plug connector based on SFP (Small Form Factor Pluggable), QSFP (Quad Small Form Factor Pluggable), OSFP (Octal Small Form Factor Pluggable), QSFP-DD (Quad Small Form Factor Pluggable-Double Density), SFP-DD (Small Form Factor Pluggable-Double Density) or DSFP (Dual Chanel Small Form-factor Pluggable). The plug connector 100 is used to mate with a receptacle connector (not shown) along a mating direction M so as to realize high-speed data transmission. Correspondingly, the receptacle connector is a receptacle connector based on SFP (Small Form Factor Pluggable), QSFP (Quad Small Form Factor Pluggable), OSFP (Octal Small Form Factor Pluggable), QSFP-DD (Quad Small Form Factor Pluggable-Double Density), SFP-DD (Small Form Factor Pluggable-Double Density) or DSFP (Dual Chanel Small Form-factor Pluggable).

Referring to FIGS. 1 to 6, in the illustrated embodiment of the present disclosure, the housing 1 includes a first housing 11 and a second housing 12. The housing 1 includes a mating surface 10 and two slots 13 located on opposite sides (for example, a left side and a right side) of the plug connector 100 and extending through the mating surface 10. The slots 13 can be used to mate with positioning protrusions (not shown) of the receptacle connector, which is beneficial to improve the insertion reliability of the plug connector 100.

Figure 7:
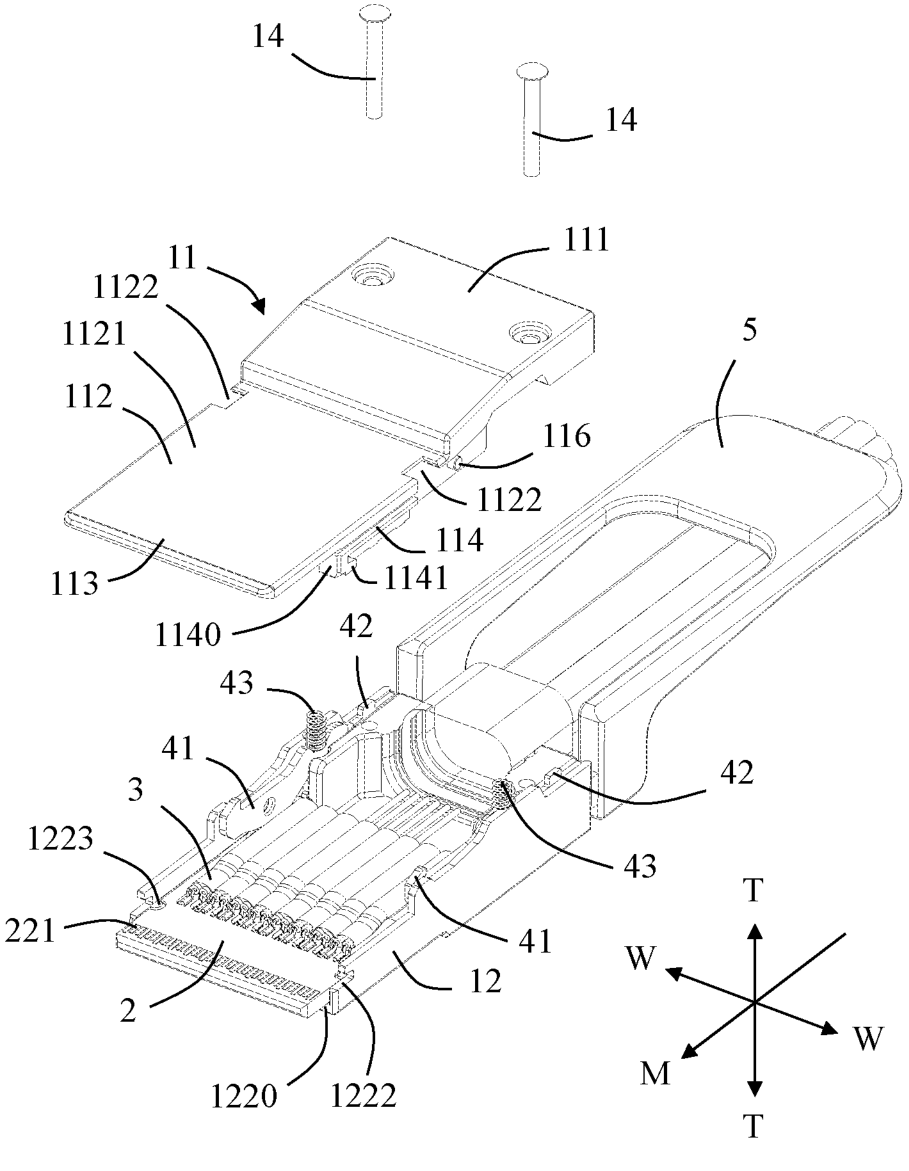
FIG. 7 is a partially exploded perspective view of FIG. 1.
Figure 8:
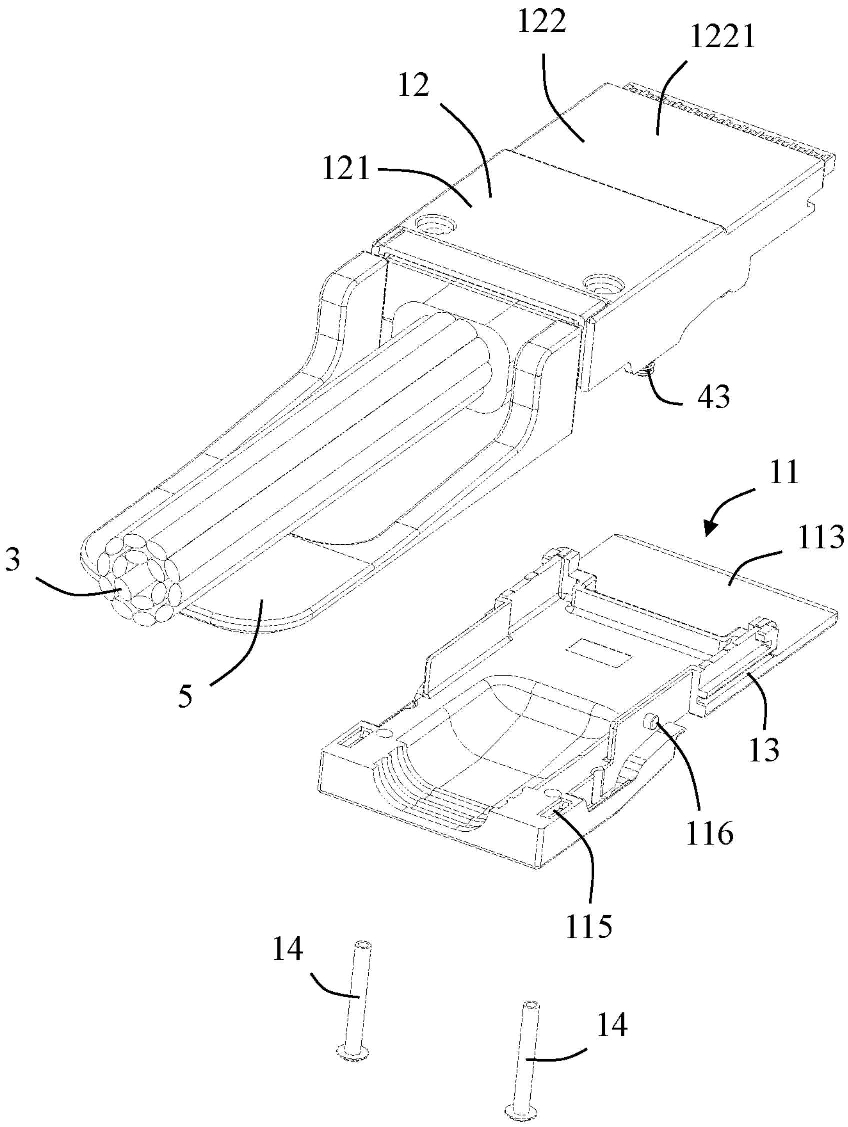
FIG. 8 is a partial perspective exploded view of FIG. 7 from another angle.

Referring to FIGS. 7 and 8, the first housing 11 includes a first base 111, a first extension portion 112 extending from the first base 111, and an extension plate 113 extending from the first extension portion 112. The first extension portion 112 includes a first surface 1121 (for example, an upper surface) and two openings 1122 extending through the first surface 1121 along a thickness direction T-T of the plug connector 100. The openings 1122 are located on opposite sides (for example, a left side and a right side) of the first extension portion 112 along a width direction W-W of the plug connector 100. Referring to FIG. 7, it is understandable to those skilled in the art that in the illustrated embodiment of the present disclosure, the mating direction M is a rear-to-front direction, the width direction W-W is a left-right direction, and the thickness direction is a vertical direction. The mating direction M, the width direction W-W and the thickness direction T-T are perpendicular to each other. In the illustrated embodiment of the present disclosure, the first extension portion 112 includes two convex portions 114 which protrude downwardly along the thickness direction T-T and are located on opposite sides (for example, a left side and a right side) of the first extension portion 112. Each convex portion 114 extends along the mating direction M. The convex portion 114 includes a first front end surface 1140 and a locking portion 1141 located at a front portion of the convex portion 114. In the illustrated embodiment of the present disclosure, the first front end surface 1140 is a vertical surface. The locking portion 1141 is of a U-shaped configuration.

The second housing 12 includes a second base 121 and a second extension portion 122 extending from the second base 121. The first base 111 corresponds to the second base 121, wherein the first base 111 is located above the second base 121 as a whole, and the first base 111 and the second base 121 are aligned in the vertical direction. The first extension portion 112 corresponds to the second extension portion 122, wherein the first extension portion 112 is located above the second extension portion 122 as a whole, and the first extension portion 112 and the second extension portion 122 are aligned in the vertical direction. The second extension portion 122 includes a second front end surface 1220. The first front end surface 1140 and the second front end surface 1220 are aligned with each other in the thickness direction T-T to jointly form the mating surface 10. The second extension portion 122 includes a second surface 1221 (for example, a lower surface). The first surface 1121 and the second surface 1221 are disposed opposite to each other along the thickness direction T-T. A front side of the second extension portion 122 includes a locking slot 1222. In the illustrated embodiment of the present disclosure, the locking slot 1222 is of a U-shaped configuration. The locking portion 1141 is fixed in the locking slot 1222 to prevent the first housing 11 and the second housing 12 from being separated from each other in the thickness direction T-T. The second extension portion 122 further includes two positioning posts 1223 on opposite sides. The positioning posts 1223 are used for positioning the built-in circuit board 2. A rear side of the second extension portion 122 is further provided with a limiting protrusion 1224 which protrudes into a corresponding opening 1122 along the thickness direction T-T.

In the illustrated embodiment of the present disclosure, the plug connector 100 further includes a bolt 14 to assemble and fix the first base 111 and the second base 121. Of course, in other embodiments, the first housing 11 and the second housing 12 may be assembled through a mutual locking structure (for example, a locking arm and a locking groove for mating with the locking arm).

Figure 9:
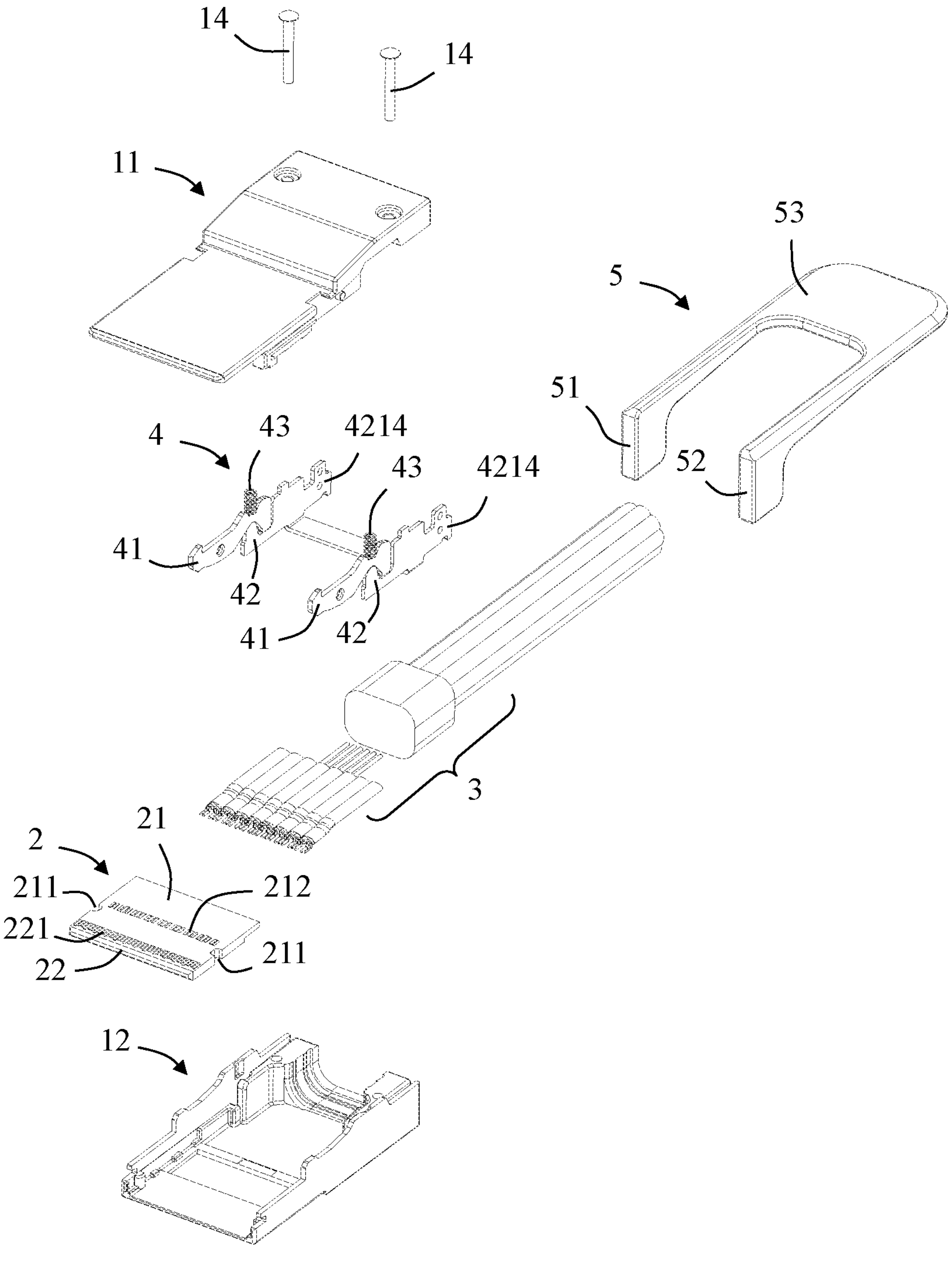
FIG. 9 is a further partial perspective exploded view of FIG. 7.
Figure 10:
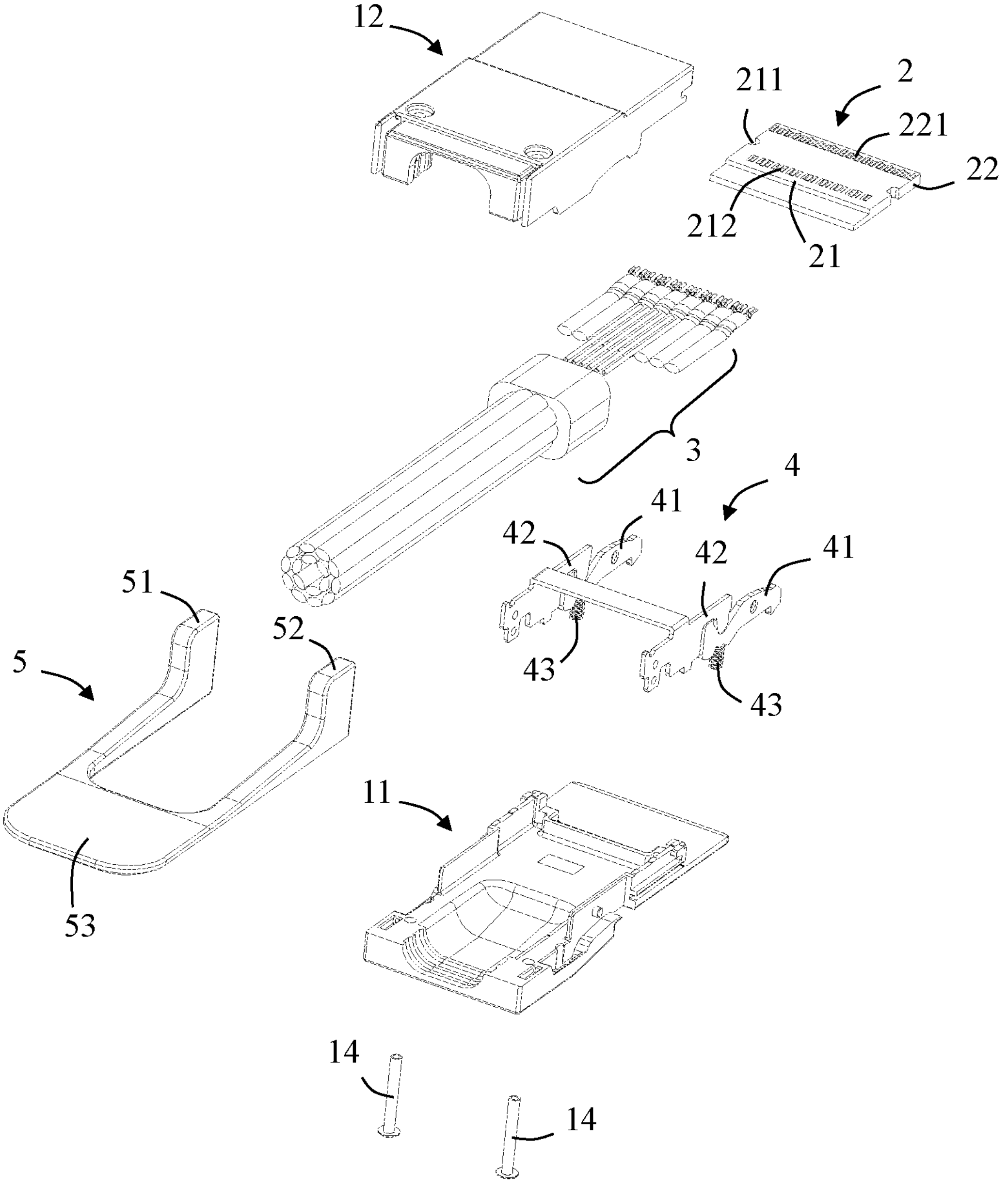
FIG. 10 is a partial perspective exploded view of FIG. 9 from another angle.
Figure 11:
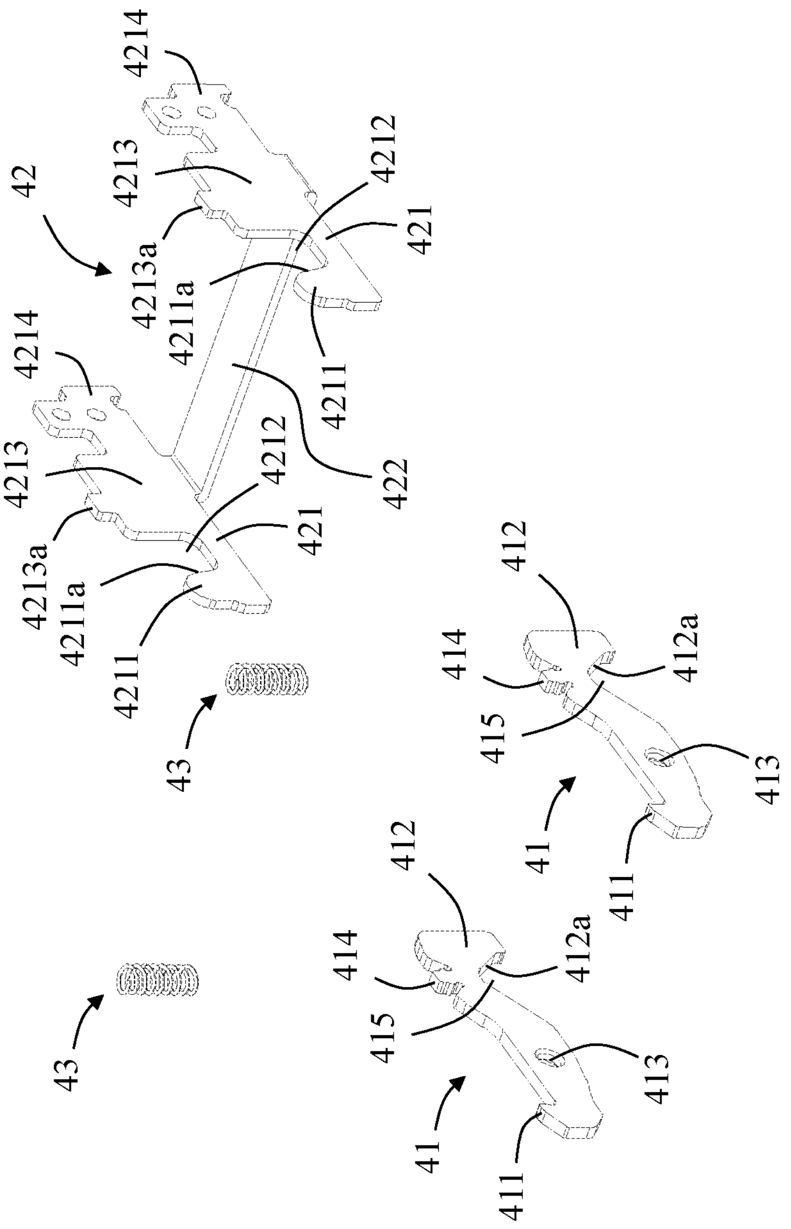
FIG. 11 is a perspective exploded view of two return springs, two locking arms and a driving member in FIG. 9.
Figure 12:
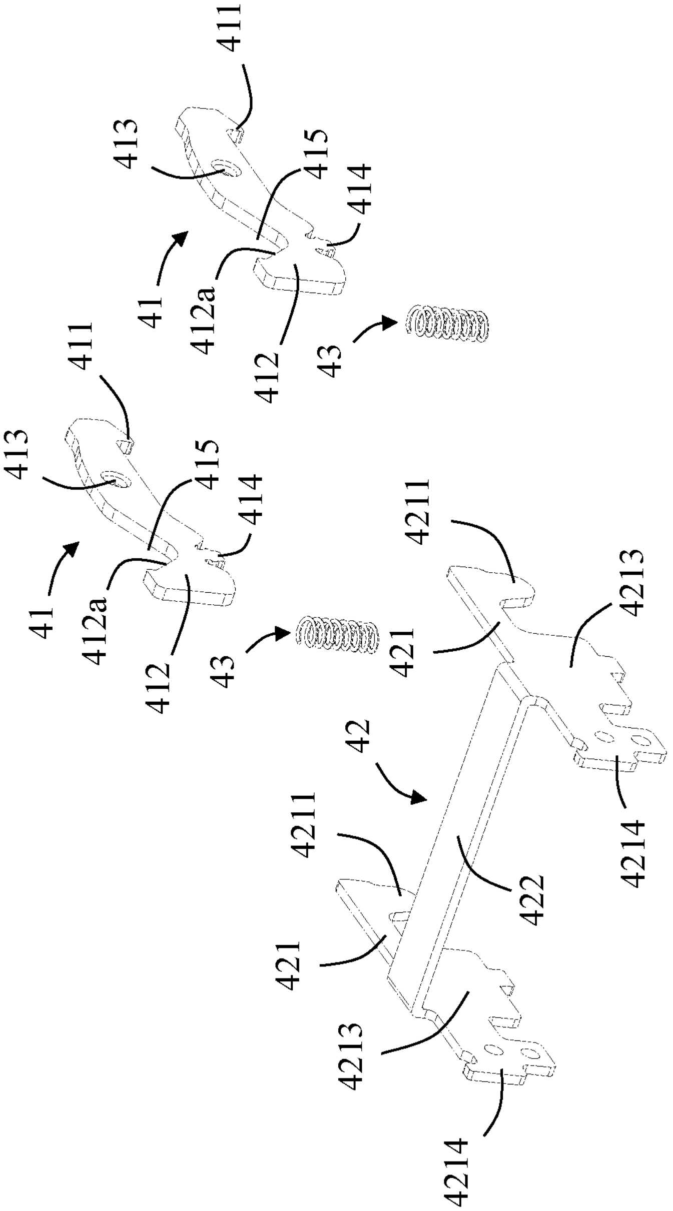
FIG. 12 is a perspective exploded view of FIG. 11 from another angle.
Figure 13:
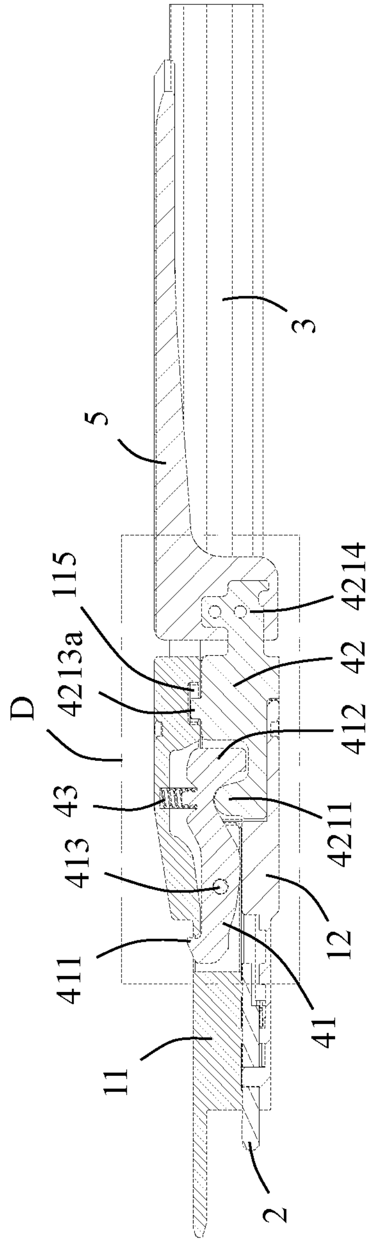
FIG. 13 is a schematic cross-sectional view taken along line C-C in FIG. 1, wherein the locking arm is located at a locked position.
Figure 14:
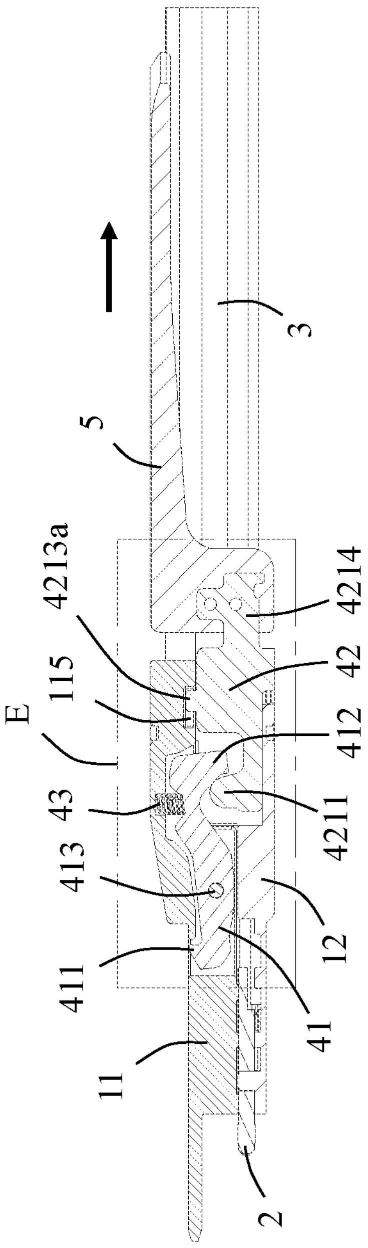
FIG. 14 is a schematic cross-sectional view of another state in FIG. 13, wherein the locking arm is located at an unlocked position.

Referring to FIGS. 7, 9 and 10, the built-in circuit board 2 includes a base plate 21 at least partially clamped between the first extension portion 112 and the second extension portion 122, and a tongue plate 22 extending forward from the base plate 21. Opposite sides of the base plate 21 include two positioning notches 211 matched with the positioning posts 1223. At least one surface of the base plate 21 is provided with a plurality of soldering pads 212 which are used for soldering and fixing with the cable 3. In the illustrated embodiment of the present disclosure, two opposite surfaces (for example, an upper surface and a lower surface) of the base plate 21 are respectively provided with the soldering pads 212, which is beneficial to maximize the use of the space of the base plate 21 as much as possible. A plurality of conductive pads 221 are provided on at least one surface of the tongue plate 22. The conductive pads 221 are used to contact the conductive terminals (not shown) of the receptacle connector so as to realize data transmission. In the illustrated embodiment of the present disclosure, the two opposite surfaces (for example, the upper surface and the lower surface) of the tongue plate 22 are respectively provided with the conductive pads 221, which is beneficial to maximize the use of the space of the tongue plate 22 as much as possible.

Figure 3:
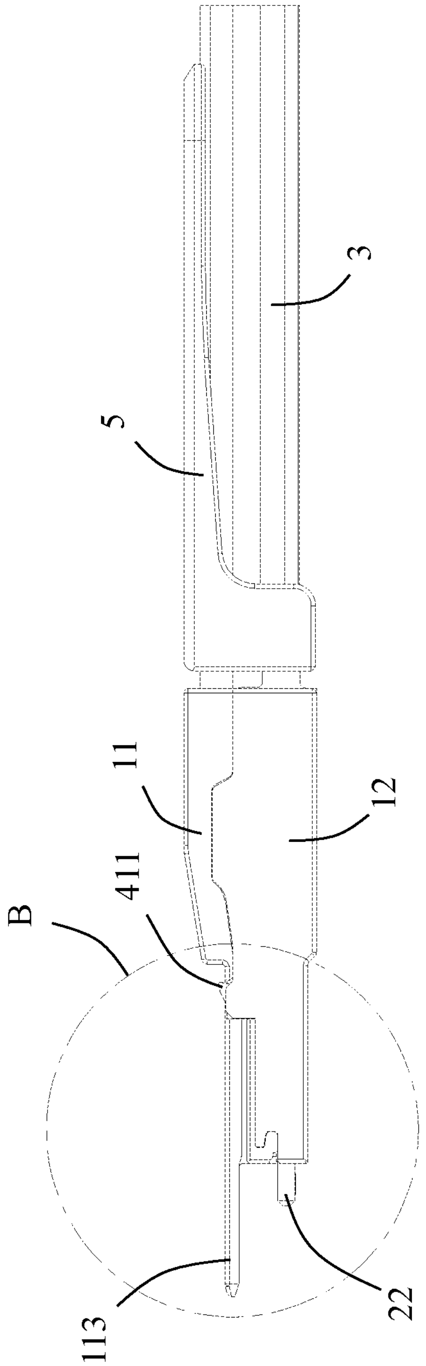
FIG. 3 is a right side view of FIG. 1.
Figure 4:
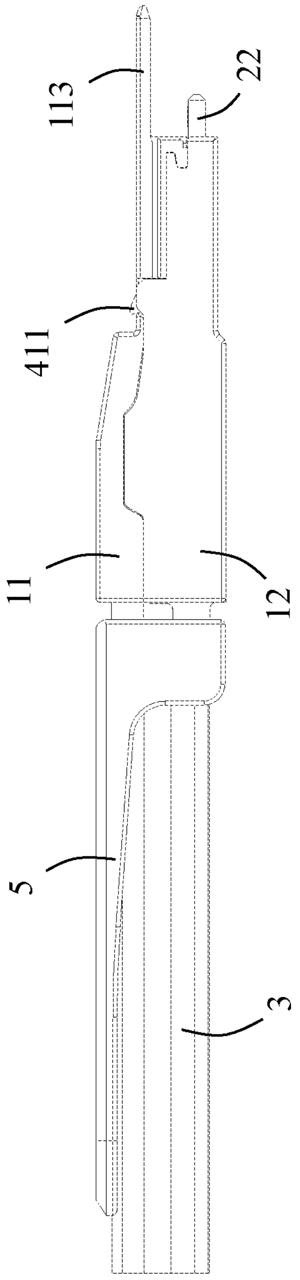
FIG. 4 is a left side view of FIG. 1.
Figure 6:
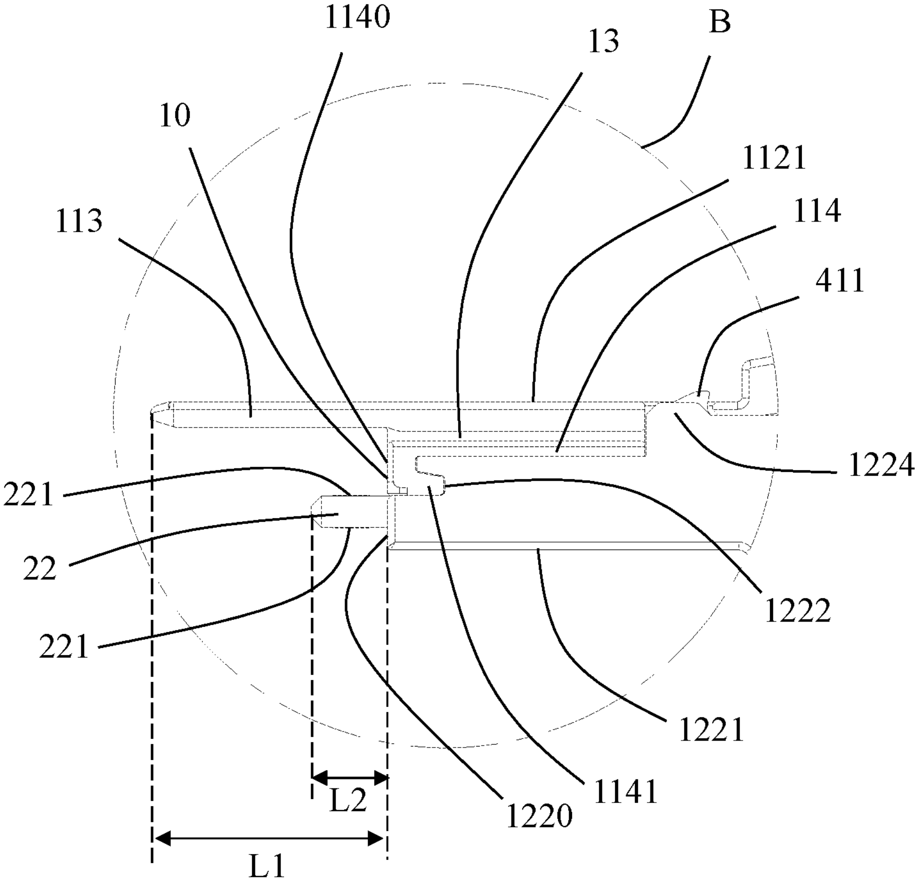
FIG. 6 is a partial enlarged view of a circled part B in FIG. 3.

As shown in FIGS. 3 and 6, both the tongue plate 22 and the extension plate 113 protrude beyond the mating surface 10 along the mating direction M. The extension plate 113 further protrudes beyond the tongue plate 22 along the mating direction M. In the illustrated embodiment of the present disclosure, a length of the extension plate 113 protruding beyond the mating surface 10 along the mating direction M is L1, a length of the tongue plate 22 protruding beyond the mating surface along the mating direction M is L2, where L1≥2*L2. With this arrangement, by appropriately increasing the length of the extension plate 113, when the plug connector 100 is inserted into the receptacle connector, the extension plate 113 will contact the receptacle connector as early as possible to achieve pre-positioning. This is also beneficial to protect the tongue plate 22 and avoid possible damage to the tongue plate 22 due to incorrect insertion angles or mismatched receptacle connectors. In addition, this design is also beneficial to increase the insertion depth of the plug connector 100 and improve the mating reliability of the plug connector 100 with the receptacle connector when the plug connector 100 is inserted in place.

The slot 13 is provided on the first extension portion 112; or the slot 13 is provided on the second extension portion 122; or the slot 13 is formed between the first extension portion 112 and the second extension portion 122 in the thickness direction T-T of the plug connector 100. In the illustrated embodiment of the present disclosure, the slot 13 is provided on the convex portion 114. The slot 13 extends backwardly to communicate with the corresponding opening 1122. A distance between the slot 13 and the first surface 1121 in the thickness direction T-T is smaller than a distance between the slot 13 and the second surface 1221. In other words, the slot 13 is arranged on an upper side.

Referring to FIGS. 9 to 16, the locking mechanism 4 includes two locking arms 41 installed on two inner and opposite sides of the second housing 12, a driving member 42 mated with the locking arms 41, and two return springs 43 mated with the locking arms 41, respectively. In the embodiment of the present disclosure, the two locking arms 41 are separated from each other, so that they can be rotated independently.

Each locking arm 41 includes a locking protrusion 411 located at a front end of the locking arm 41, an abutting portion 412 located at a rear end of the locking arm 41, and a pivot portion 413 located between the locking protrusion 411 and the abutting portion 412. The locking arm 41 is rotatable around the pivot portion 413. The slot 13 extends backwardly to be adjacent to the locking protrusion 411. This arrangement increases a length of each slot 13 along the mating direction M and is beneficial to increase an insertion depth of the plug connector 100, thereby improving the insertion reliability of the plug connector 100.

In the illustrated embodiment of the present disclosure, the return spring 43 is a compression spring. One end of the compression spring abuts against the top of the locking arm 41; and another end of the compression spring abuts against a lower surface of the first extension portion 112. A contact position of the locking protrusion 411 and the locking arm 41, and a contact position of the return spring 43 and the locking arm 41 are located on two sides of the pivot portion 413, respectively. With this arrangement, the locking arm 41 is equivalent to a seesaw of which a fulcrum is the pivot portion 413. When no external force is applied, under the action of the compression spring, the locking protrusion 411 is located in the corresponding opening 1122 and protrudes upwardly beyond the first surface 1121. Under this condition, the locking protrusion 411 can be matched with a corresponding locking structure of the receptacle connector, that is, this state is a locking state when the plug connector 100 is inserted into the receptacle connector.

Figure 5:
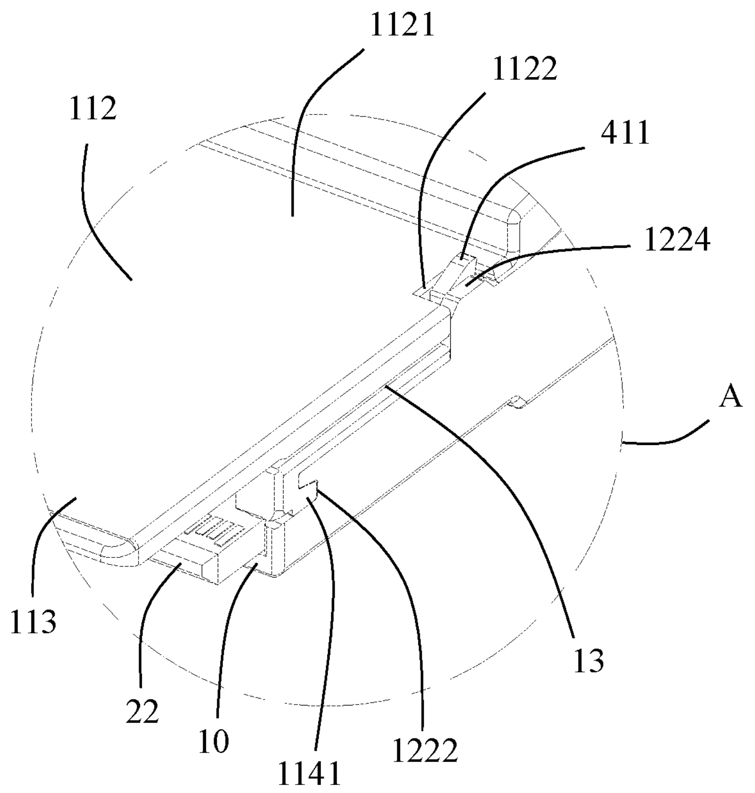
FIG. 5 is a partial enlarged view of a circled part A in FIG. 1.

As shown in FIG. 5, each limiting protrusion 1224 is located outside the corresponding locking protrusion 411 along the width direction W-W of the plug connector 100 so as to limit the locking protrusion 411.

In the illustrated embodiment of the present disclosure, in order to better fix the compression spring, each locking arm 41 further includes a mounting post 414. One end of the compression spring is sleeved on the mounting post 414 to prevent the compression spring from leaving its original position after being stressed.

In the illustrated embodiment of the present disclosure, the pivot portion 413 includes a pivot hole. The first housing 11 includes a pivot shaft 116 that matches with the pivot hole. The pivot shaft 116 is integrally formed on the first housing 11. The locking arm 41 is rotatable around the pivot shaft 116 under the action of the external force. Of course, in other embodiments, the pivot shaft 116 may also be integrally formed on the second housing 12; or the pivot shaft 116 is a separate shaft assembled to the first housing 11 and/or the second housing 12. Each locking arm 41 is rotatable in an imaginal plane P (e.g., a vertical plane, referring to FIG. 15) in which an axial line AL of the return spring 43 abutting against the locking arm 41 is also located. With such arrangement, the return spring 43 can provide a straightforward force directly to the corresponding locking arm 41, so that smoother rotation of the locking arm 41 can be achieved.

Of course, in other embodiments, the return spring 43 may also be a tension spring. One end of the tension spring is fixed to the locking arm 41, and the other end of the tension spring is fixed to the housing 1.

In addition, each locking arm 41 further includes a first recess 415 located between the abutting portion 412 and the pivot portion 413, and an inner abutting surface 412*a* exposed in the first recess 415. In the illustrated embodiment of the present disclosure, the first recess 415 is located below the mounting post 414 and is aligned with the mounting post 414 in the vertical direction. The inner abutting surface 412*a* is provided on the abutting portion 412. In the illustrated embodiment of the present disclosure, the inner abutting surface 412*a* is an inclined surface.

Figure 15:
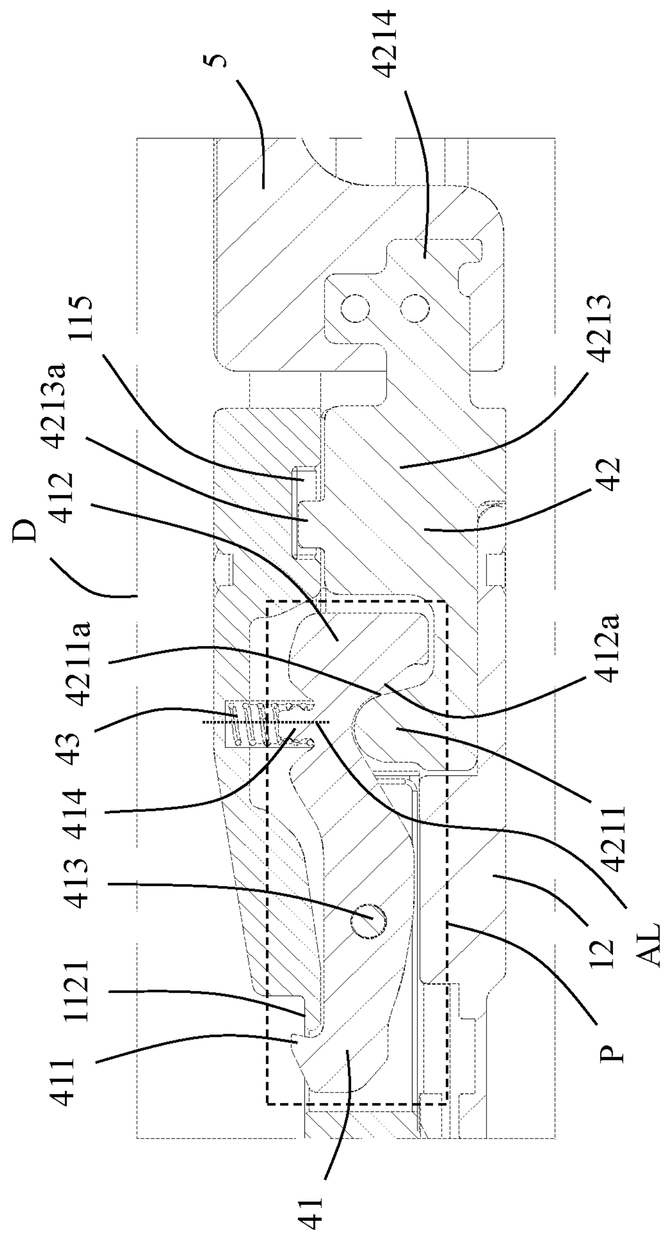
FIG. 15 is a partial enlarged view of a frame part D in FIG. 13.
Figure 16:
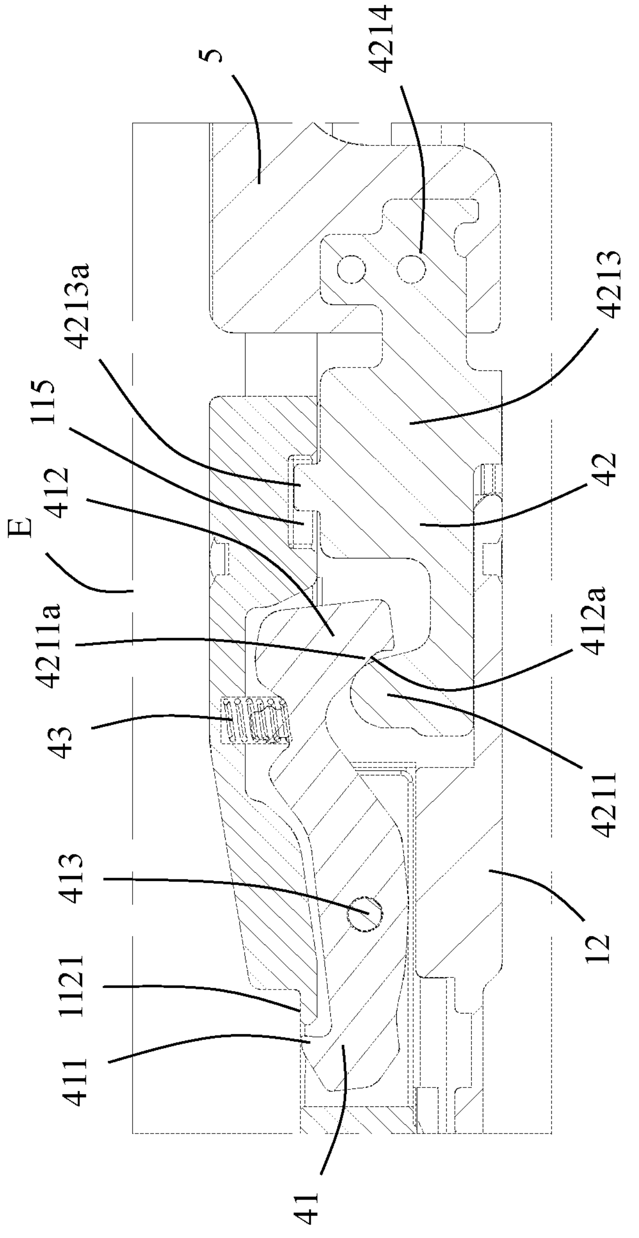
FIG. 16 is a partial enlarged view of a frame part E in FIG. 14.

The driving member 42 is connected to the pull strap 5. The driving member 42 includes two driving arms 421 located on opposite sides and a connecting rod 422 which connects the two driving arms 421. Each driving arm 421 is located at a rear end of the corresponding locking arm 41 and abuts against the locking arm 41. Each driving arm 421 includes a protruding portion 4211 received in the first recess 415, a second recess 4212 for receiving the abutting portion 412, a base portion 4213 connected to the protruding portion 4211 and a fixing portion 4214 protruding backwardly from the base portion 4213. The protruding portion 4211 includes an outer abutting surface 4211*a* which abuts against the inner abutting surface 412*a*. In the illustrated embodiment of the present disclosure, the outer abutting surface 4211*a* is a curved surface. Through the cooperation of the curved surface and the inclined surface, the smoothness of the interaction between the driving arm 421 and the locking arm 41 is improved. As shown in FIGS. 15 and 16, the base portion 4213 is provided with a protrusion 4213*a* extending upwardly. The first housing 11 includes a limiting slot 115. The protrusion 4213*a* is movable in the limiting slot 115 under the action of external force. In the illustrated embodiment of the present disclosure, the fixing portion 4214 is insert-molded in the pull strap 5. The connecting rod 422 connects the base portions 4213 of the two driving arms 421 to strengthen the structure of the driving member 42, improve the stability of the driving member 42 when moving, and improve the synchronization of the movement of the two locking arms 41.

As shown in FIG. 9, the pull strap 5 includes a first connecting portion 51 and a second connecting portion 52 which are respectively connected to the fixing portions 4214 of the two locking arms 41. The first connecting portion 51 and the second connecting portion 52 respectively extend in a vertical direction and are parallel to each other. In the illustrated embodiment of the present disclosure, the first connecting portion 51 and the second connecting portion 52 are both L-shaped. The pull strap 5 further includes a bridge portion 53 connecting the first connecting portion 51 and the second connecting portion 52. The bridge portion 53 extends in a horizontal direction.

The pull strap 5 is movable in a direction opposite to the mating direction M under the pulling of the external force, so as to directly or indirectly drive the locking protrusions 411 to move away from the first surface 1121 in the thickness direction T-T. Specifically, referring to FIGS. 14 and 16, in the illustrated embodiment of the present disclosure, when the pull strap 5 moves in the direction opposite to the mating direction M under the pulling of the external force, each outer abutting surface 4211*a* of the protruding portion 4211 abuts against the inner abutting surface 412*a* of the abutting portion 412, and slides on the inner abutting surface 412*a*. Under this condition, an upward force is generated to move the abutting portions 412 upwardly and compress the compression springs. At the same time, the locking protrusions 411 move downwardly to move away from the first surface 1121. This state is an unlocked state of the plug connector 100.

When the external force is removed, the return springs 43 release elastic force, so that the abutting portions 412 move downwardly. At the same time, the locking protrusions 411 move upwardly, and the locking arms 41 return to their original positions.

In the present disclosure, the two return springs 43 are provided to make the force of the locking arms 41 more even, which improves the stability of the movement of the locking arms 41.

The above embodiments are only used to illustrate the present disclosure and not to limit the technical solutions described in the present disclosure. The understanding of this specification should be based on those skilled in the art. Descriptions of directions, although they have been described in detail in the above-mentioned embodiments of the present disclosure, those skilled in the art should understand that modifications or equivalent substitutions can still be made to the application, and all technical solutions and improvements that do not depart from the spirit and scope of the application should be covered by the claims of the application.

What is claimed is:

1. A plug connector, comprising:

a housing;

a built-in circuit board, the built-in circuit board being partially located in the housing, the built-in circuit board comprising a tongue plate and a plurality of conductive pads provided on the tongue plate; and a cable, the cable being electrically connected to the built-in circuit board;

wherein the plug connector further comprises two locking arms installed in the housing, a driver mated with the locking arms, and a pull strap connected with the driver;

wherein each locking arm comprises a locking protrusion at a first end of the locking arm, an abutting portion located at a second end of the locking arm, and a pivot portion located between the locking protrusion and the abutting portion, the locking protrusion protrudes beyond the housing along a thickness direction of the plug connector;

wherein the driver comprises two driving arms, each driving arm matches with a corresponding locking arm, each driving arm comprises a protruding portion for pulling the abutting portion;

wherein the locking arm is rotatable around the pivot portion when the pull strap is pulled by an external force, so that the locking protrusion moves along the thickness direction inside the housing;

wherein the plug connector further comprises two return springs, each return spring abuts against a corresponding locking arm, and each return spring is adapted to return the corresponding locking arm to an original position after the external force is removed; and wherein each locking arm comprises a first recess and a mounting post disposed opposite to the first recess along the thickness direction of the plug connector; both the first recess and the mounting post are disposed on a first side of the pivot portion along a mating direction of the plug connector; the locking protrusion is disposed on a second side of the pivot portion along the mating direction of the plug connector; the first side and the second side are disposed oppositely with respect to the pivot portion along the mating direction of the plug connector; the protruding portion of the driving arm is received in the first recess; one end of the return spring is sleeved on the mounting post and another end of the return spring abuts against the housing.

2. The plug connector according to claim 1, wherein the two locking arms are located on opposite sides of the housing, respectively; the two driving arms are located on opposite sides of the housing, respectively; and each driving arm is connected with the second end of the corresponding locking arm.

3. The plug connector according to claim 1, wherein each locking arm comprises an inner abutting surface exposed in the first recess; each driving arm comprises a second recess to receive the abutting portion, and the protruding portion comprises an outer abutting surface to abut against the inner abutting surface; wherein the inner abutting surface is an inclined surface, and the outer abutting surface is a curved surface.

4. The plug connector according to claim 1, wherein the pivot portion comprises a pivot hole, and the plug connector comprises a pivot shaft matched with the pivot hole.

5. The plug connector according to claim 1, wherein each driving arm comprises a base portion connected to the protruding portion and a fixing portion extending from the base portion; and wherein the pull strap comprises a first connecting portion and a second connecting portion connected to the fixing portions of the two driving arms, respectively.

6. The plug connector according to claim 5, wherein each of the first connecting portion and the second connecting portion extends in a vertical direction, and the first connecting portion and the second connecting portion are parallel to each other.

7. The plug connector according to claim 6, wherein the pull strap further comprises a bridge portion connecting the first connecting portion and the second connecting portion, and the bridge portion extends in a horizontal direction.

8. The plug connector according to claim 5, wherein the base portion of each driving arm is provided with a protrusion, the housing comprises two limiting slots, and the protrusion is movable in a corresponding limiting slot under the action of the external force.

9. The plug connector according to claim 5, wherein the driver comprises a connecting rod connecting the base portions of the two driving arms.

10. The plug connector according to claim 1, wherein the housing comprises a first housing and a second housing, the first housing comprises a first base and a first extension portion extending from the first base, the second housing comprises a second base and a second extension portion extending from the second base, the first base corresponds to the second base in the thickness direction of the plug connector, the first extension portion corresponds to the second extension portion in the thickness direction, and the built-in circuit board is at least partially clamped between the first extension portion and the second extension portion.

11. The plug connector according to claim 10, wherein the housing comprises a mating surface, the first housing comprises an extension plate extending from the first extension portion along a mating direction of the plug connector, both the tongue plate and the extension plate protrude beyond the mating surface along the matting direction, and the extension plate further protrudes beyond the tongue plate along the mating direction.

12. The plug connector according to claim 11, wherein a length of the extension plate protruding beyond the mating surface along the mating direction is L1, and a length of the tongue plate protruding beyond the mating surface along the mating direction is L2, where L1≥2*L2.

13. The plug connector according to claim 11, wherein the first extension portion comprises a first surface and two openings extending through the first surface along the thickness direction, the openings are located on opposite sides of the first extension portion, and each locking protrusion is located in a corresponding opening and protrudes beyond the first surface along the thickness direction.

14. The plug connector according to claim 10, wherein the first extension portion comprises a locking portion, the second extension portion comprises a locking slot, the locking portion is fixed in the locking slot so as to prevent the first housing and the second housing from being separated from each other in the thickness direction.

15. The plug connector according to claim 10, wherein the second extension portion comprises two positioning posts, opposite sides of the built-in circuit board define positioning notches matched with the positioning posts, and the plurality of conductive pads are located on opposite surfaces of the tongue plate.

16. A plug connector, comprising:

a housing;

a built-in circuit board partially located in the housing, the built-in circuit board comprising a tongue plate and a plurality of conductive pads provided on the tongue plate; and a cable electrically connected to the built-in circuit board;

wherein the plug connector further comprises two locking arms mounted to the housing, a driver mated with the locking arms, and a pull strap connected with the driver;

wherein each locking arm comprises a locking protrusion at a first end of the locking arm, an abutting portion located at a second end of the locking arm, and a pivot portion located between the locking protrusion and the abutting portion, the locking protrusion protrudes beyond the housing along a thickness direction of the plug connector;

wherein the driver is configured for pulling the abutting portion;

wherein the locking arm is rotatable around the pivot portion when the pull strap is pulled by an external force, so that the locking protrusion moves along the thickness direction inside the housing;

wherein the plug connector further comprises two return springs, each return spring abuts against a corresponding locking arm, and each return spring is configured to return the corresponding locking arm to an original position after the external force is removed; and wherein each locking arm comprises a first recess and a mounting post disposed opposite to the first recess along the thickness direction of the plug connector; both the first recess and the mounting post are disposed on a first side of the pivot portion along a mating direction of the plug connector; the locking protrusion is disposed on a second side of the pivot portion along the mating direction of the plug connector; the first side and the second side are disposed oppositely with respect to the pivot portion along the mating direction of the plug connector; the driver is at least partially received in the first recess; one end of the return spring is sleeved on the mounting post and another end of the return spring abuts against the housing.

17. The plug connector according to claim 16, wherein the two locking arms are separated from each other.

18. The plug connector according to claim 16, wherein each locking arm is rotatable in a plane in which an axial line of the return spring abutting against the locking arm is also located.

19. A plug connector, comprising:

a housing;

a built-in circuit board, the built-in circuit board being partially located in the housing, the built-in circuit board comprising a tongue plate and a plurality of conductive pads provided on the tongue plate; and a cable, the cable being electrically connected to the built-in circuit board;

wherein the plug connector further comprises two locking arms installed in the housing, a driver mated with the locking arms, and a pull strap connected with the driver;

wherein each locking arm comprises a locking protrusion at a first end of the locking arm, an abutting portion located at a second end of the locking arm, and a pivot portion located between the locking protrusion and the abutting portion, the locking protrusion protrudes beyond the housing along a thickness direction of the plug connector;

wherein the driver comprises two driving arms, each driving arm matches with a corresponding locking arm, each driving arm comprises a protruding portion for pulling the abutting portion;

wherein the locking arm is rotatable around the pivot portion when the pull strap is pulled by an external force, so that the locking protrusion moves along the thickness direction inside the housing;

wherein the plug connector further comprises two return springs, each return spring abuts against a corresponding locking arm, and each return spring is adapted to return the corresponding locking arm to an original position after the external force is removed;

wherein the housing comprises a first housing and a second housing, the first housing comprises a first base and a first extension portion extending from the first base, the second housing comprises a second base and a second extension portion extending from the second base, the first base corresponds to the second base in the thickness direction of the plug connector, the first extension portion corresponds to the second extension portion in the thickness direction, and the built-in circuit board is at least partially clamped between the first extension portion and the second extension portion;

wherein the first extension portion comprises a first surface and two openings extending through the first surface along the thickness direction, the openings are located on opposite sides of the first extension portion, and each locking protrusion is located in a corresponding opening and protrudes beyond the first surface along the thickness direction; and wherein a side of the second extension portion comprises two limiting protrusions, each limiting protrusion protrudes into the corresponding opening along the thickness direction, each limiting protrusion is located outside a corresponding locking protrusion along a width direction of the plug connector so as to limit the corresponding locking protrusion.

20. The plug connector according to claim 19, wherein each locking arm comprises a first recess and a mounting post disposed opposite to the first recess along the thickness direction of the plug connector; both the first recess and the mounting post are disposed on a first side of the pivot portion along a mating direction of the plug connector; the locking protrusion is disposed on a second side of the pivot portion along the mating direction of the plug connector; the first side and the second side are disposed oppositely with respect to the pivot portion along the mating direction of the plug connector; the driver is at least partially received in the first recess; one end of the return spring is sleeved on the mounting post and another end of the return spring abuts against the housing.

* * * * *